Patented Dec. 15, 1953

2,662,921

UNITED STATES PATENT OFFICE 2,662,921

CATALYST AND METHOD FOR SELECTIVE OXIDATION

William R. Middleton, Wenonah, N. J., assignor to Socony-Vacuum Oil Company, Incorporated, a corporation of New York No Drawing. Application January 9, 1951,
Serial No. 205,231

8 Claims. (Cl. 260—604)

The present invention relates to the oxidation of organic compounds and, more particularly to selective catalytic conversion of methyl and methylene groups to carbonyl groups by gas containing free oxygen in the presence of a catalyst containing at least one oxide of tellurium and at least one oxide of rhenium.

At the outset it is to be appreciated that in the co-pending application of Frederick P. Richter for United States Letters Patent Serial No. 139,529 filed January 19, 1950 the basic reactions have been disclosed and that the present invention provides an improvement primarily of the catalyst disclosed in the co-pending application to which reference has been made and of the method described therein.

In general, as in the method described in the aforesaid co-pending application, the present method involves contacting the vapors of an organic substance having hydrogen atoms of a methyl or methylene group activated by the proximity of a double bond; i. e., alpha to an unsaturated carbon atom, or a hydroxyl group with a gas containing free oxygen in the presence of finely divided catalyst. It is to be appreciated that the phrase "gas containing free oxygen" includes elemental oxygen, pure diatomic oxygen, diatomic oxygen diluted with an inert gas such as nitrogen, helium, carbon dioxide and triatomic oxygen or ozone, and air.

Broadly illustrative of the classes of compounds which may be oxidized in this manner and the products obtained are the following equations:

(1)

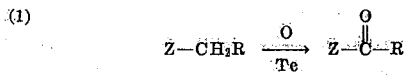

where Z is a monovalent radical having at least one center of unsaturation such as C=O; a group capable of oxidation to a carbonyl group for example a hydroxyl group; C≡C; C=C; or the double bond of an aryl group directly adjacent to the methyl or methylene group and R is hydrogen or alkyl or cycloalkyl or aryl or alicyclic or heterocyclic; when R is other than hydrogen it can be substituted by any substituent which will survive under the reaction conditions, for example, a phenyl group, a halogen, a nitro group and the like.

(a)

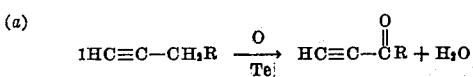

(b)

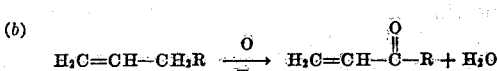

(c)

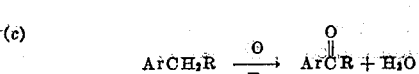

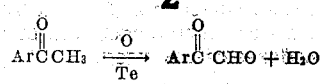

where Ar is an aryl radical substituted or unsubstituted.

(2)

(a) 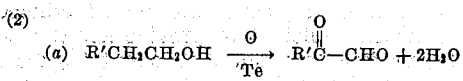

(b) 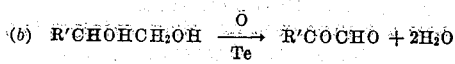

where R' is hydrogen, alkyl, cycloalkyl, aryl, heterocyclic and where other than hydrogen may be substituted by any substituent which will survive under the reaction conditions, for example, a phenyl group, a halogen, a nitro group and the like.

It will be recognized that in the foregoing Z represents

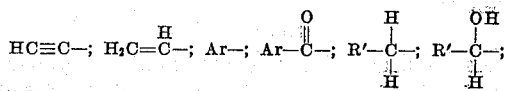

and

(3) Compounds containing a center of unsaturation directly adjacent a methyl or methylene group such as the double bond of an aryl group as an integral part of an alicyclic ring system:

(a) 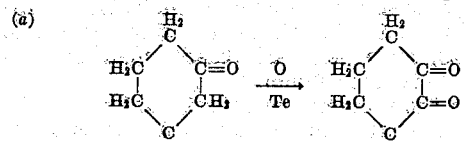

(b) 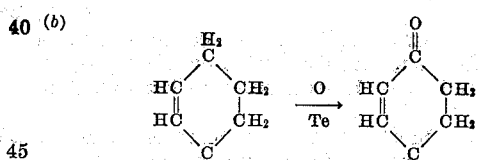

(c) 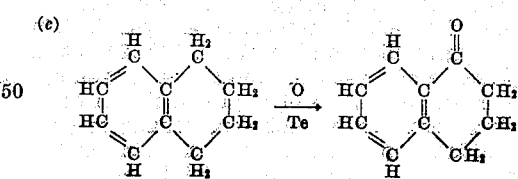

It is to be noted that

has been used in the foregoing equations to indicate a reaction taking place in the presence of a gas containing free oxygen as defined hereinbefore and a catalyst comprising at least one oxide of tellurium and at least one oxide of rhenium.

The physical state of the novel catalyst comprising at least one oxide of tellurium and at least one oxide of rhenium apparently is unimportant. For example, it can be used to catalyze the reactions illustrated hereinbefore as a finely divided mixture of the oxides suitable for use in continuous operation wherein the catalyst is in "fluidized" form. It can be used as a coating on an active or inert support and it can be used without support as a larger particle than that required for "fluid" technique.

For the preparation of the novel promoted or mixed catalysts, whether supported by active or inert materials or unsupported, either of the following procedures can be used.

Procedure A

An aqueous solution of perrhenic acid is added to a concentrated aqueous solution of telluric acid in amount sufficient to provide about 1 to about 40, preferably about 2 to about 20, mole per cent of rhenium oxide based upon the tellurium oxide present in the mixture.

When the promoted or mixed catalyst is to be used in the unsupported form the mixed aqueous solution is exaporated to dryness and the residue mechanically sub-divided. Spray drying or powder metallurgy techniques can be substituted for the drying and mechanical sub-division when desired.

When the promoted or mixed catalyst is to be supported, the aqueous solution of the mixed acids is used to saturate the support which is then dried.

Procedure B

An aqueous solution of perrhenic is prepared and neutralized carefully with a basic compound of ammonia, alkali metals or alkaline earth metals, for example, an aqueous solution of sodium hydroxide or potassium hydroxide, or ammonium hydroxide, calcium hydroxide, calcium carbonate, magnesium hydroxide or carbonate or the like. The neutralized perrhenic acid solution is then thoroughly mixed with an aqueous solution of telluric acid in amount sufficient to provide about 1 to about 40, preferably about 2 to about 20, mole per cent (based upon the tellurium oxide) of rhenium oxide.

When the promoted or mixed catalyst is to be used unsupported the aqueous solution is evaporated to dryness and the residue mechanically sub-divided.

When the promoted or mixed catalyst is to be used upon a support the active or inert support is saturated with the aqueous solution and then dried.

Reference has been made hereinbefore to active and inert supports for the promoted or mixed catalysts. An active support is one which in the absence of a tellurium catalyst as described in co-pending application Serial No. 139,529 but in the presence of a gas containing free oxygen accelerates the oxidation of organic substances of the class described hereinbefore usually to produce oxidation products other than those of the carbonyl type illustrated hereinbefore. An organic carbonyl group is a group which exists in that state of oxidation which is intermediate between a primary or secondary alcohol and a carboxylic acid. Silica gel is a member of the group of materials classed as active supports.

An inert support is one which in the absence of a tellurium catalyst as described in co-pending application Serial No. 139,529 but in the presence of a gas containing free oxygen does not accelerate to any appreciable extent the oxidation of organic substances of the class described hereinbefore to produce oxidation products. Illustrative of the materials classed as inert supports is the fused alumina available as Tabular Alumina.

In the illustrative but not limiting examples provided hereinafter the concentration of tellurium (as $TeO_2$) upon the support is approximately 15 grams per 100 cubic centimeters. This is not critical and can be varied within the limits set by the concentration of the solutions employed and the porosity of the support.

EXAMPLE I

A gaseous mixture of propylene and air in the proportion of the one volume of propylene to three volumes of air was passed through one volume of promoted or mixed catalyst at the rate of four volumes of the gaseous mixture per minute equivalent to a space velocity of four or a propylene space velocity of one. The reaction zone was maintained at a temperature of about 652° to about 653° F. The maximum observed temperature rise due to the reaction was 4° F. (It has been noted that the conversion of one mole per cent of propylene to acrolein results in a rise of about 1° F.)

The catalyst employed in this run was prepared by the method of Procedure B given hereinbefore and contained 0.05 mole of $NaReO_4$, or equivalent oxides, per mole of tellurium oxide. In other words, the concentration of rhenium oxide was about 5 mole per cent based upon the tellurium.

The gaseous product of the conversion was absorbed in water at a temperature of about 40° F. It is to be noted that although the observed rise in temperature due to the reaction was only about 4° F. nevertheless about 9.5 per cent of the propylene was converted to acrolein.

EXAMPLE II

A gaseous mixture of propylene and air in the proportion of one volume of propylene to three volumes of air was passed at essentially atmospheric pressure through about 0.82 volumes of catalyst at a rate of about four volumes of gaseous mixture per minute or a space velocity of 4.88 equivalent to a propylene space velocity of 1.22. The temperature of the reaction zone was maintained at about 651°–656° F. The maximum observed temperature rise in the catalyst due to the reaction was 7° F.

The catalyst was prepared in accordance with the method given in Procedure A (hereinbefore) and contained 0.05 mole of $ReO_x$ per mole of tellurium oxide, i. e., 5 mole per cent $ReO_x$.

The gaseous product was absorbed in water at a temperature of about 40° F. Analysis of the solution so obtained indicated that about 10.3 per cent of the propylene was converted to acrolein.

EXAMPLE III

A gaseous mixture of propylene and air in the proportion of one volume of propylene to three volumes of air was passed at essentially atmospheric pressure through one volume of catalyst at a space velocity of four (propylene space velocity 1). The temperature of the reaction zone was maintained at about 702°–703° F. The maximum observed rise in temperature in the catalyst bed due to the reaction was 3° F.

The catalyst was prepared by the method described under Procedure A supra except that no perrhenic acid or other promoter material was added. In other words, the catalyst comprised predominantly at least one oxide of tellurium as defined in co-pending application Serial No. 139,529. Consequently, the results of this run establish a norm with which other results can be compared.

The gaseous product was absorbed in water at a temperature of about 40° F. Analysis of the aqueous solution so obtained indicated that about 2.1 per cent of the propylene was converted to acrolein although the reaction temperature employed was about 50° F. higher.

The foregoing indicates that with rhenium promoted tellurium catalysts reaction temperatures of the order of about 50° F. below those required when employing the unpromoted catalysts described in co-pending application Serial No. 139,529 can be used and increased conversions obtained. Accordingly, the present invention provides a means for converting organic substances of the class described to carbonyls at temperatures of about 600° to about 700° F.

In a manner similar to that illustrated hereinbefore a mixture of refinery gases, such as a propylene-propane fraction containing, for example, about 50 mole per cent propylene and about 45 mole per cent propane can be treated to obtain acrolein. Toluene can be selectively oxidized to benzaldehyde and isobutylene can be selectively oxidized to methacrolein. Broadly, as disclosed in co-pending application Serial No. 139,529, compounds having at least one methyl or methylene group directly adjacent to a center of unsaturation or directly adjacent to a hydroxyl group can be oxidized to the corresponding compounds in which the methyl or methylene group is present as an aldehyde or ketonic group by gas containing free oxygen in the presence of a catalyst comprising about 1 to about 40, preferably about 2 to about 20 mole per cent of rhenium oxide and the balance predominantly at least one oxide of tellurium.

The organic substance to oxidizing gas ratio can be varied over a wide range although it is preferred to use ratios of about 1:1 to about 1:9.

Broadly defined, the substances which can be oxidized with air or other gas containing free oxygen in the presence of non-stoichiometric quantities of finely divided catalyst comprising predominantly at least one oxide of tellurium, are those having hydrogen atoms attached to a carbon atom alpha to an unsaturated carbon atom such as in olefins of three or more carbon atoms; isolated diolefins; i. e., diolefins in which there is at least one methylene or substituted methylene group between the olefinic carbons; acetylenic hydrocarbons having at least three carbon atoms; conjugated diolefins of more than four carbon atoms; cycloolefins, for example, cyclopentadiene; aromatic hydrocarbons, such as xylene, methyl naphthalenes, methyl anthracenes and the like, or alpha to a hydroxyl group, such as ethanol, propanol, pentanol, isopentanol, octanol, octadecanol, octadecenol, ethandiol, propandiol, butylene glycol, pentylene glycol, octandiol and in general hydrocarbons, substituted hydrocarbons and primary and secondary alcohols of up to 22 carbon atoms. For example, paraffin wax (18–24 carbon atoms) can be halogenated, dehydrohalogenated to the olefinic form and then oxidized.

Thus, for example, substituted butadiene derivatives, conforming to the general formula

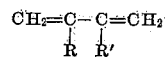

wherein R and R' are alkyl or aryl groups substituted or unsubstituted can be oxidized in the manner described hereinbefore and converted to the corresponding carbonyl compounds.

Thus, for example, 1,3-butadiene, 1,3-pentadiene (alphamethylbutadiene) 1,4-pentadiene, 2-methyl-1,3-butadiene (isoprene), 1,5-hexadiene (diallyl), 2-methyl-1,4-pentadiene (isodiallyl), 2,3-dimethyl-1,3-butadiene (diisopropenyl), 3-methyl-1,3-hexadiene, 3-methyl-2,4-hexadiene, 2,7-heptadiene, 4-methyl-1,6-heptadiene, 2,5-dimethyl-2,4-hexadiene, 3-methyl-1,5-octadiene, 1,4-nonadiene, 3,7-decadiene can be oxidized with air in the presence of finely divided catalyst comprising predominantly at least one oxide of tellurium at temperatures of about 350° to about 550° C. or generally at temperatures at which the diolefin is gaseous but below the cracking temperature of the diolefin to the corresponding carbonyl compounds.

Illustrative of another group of hydrocarbons which can be oxidized to the corresponding carbonyl compounds in gaseous phase with pure or diluted gaseous oxygen in the presence of the "tellurium" catalyst at temperatures at which the hydrocarbon is gaseous but below the cracking temperature of the hydrocarbon are the following members of the acetylene series: 2-butyne, 2-pentyne, 2-hexyne, 3-hexyne, 4-methyl-2-pentyne, 3-heptyne, 5-methyl-2-hexyne, 4,4-dimethyl-2-pentyne, 5-methyl-5-ethyl-3-heptyne, 2-undecyne, 6-dodecyne, 2-hexadecyne, 9-octadecyne.

Illustrative of the aromatic hydrocarbons which can be oxidized to the corresponding carbonyl compounds by air in the presence of the "tellurium" catalyst at temperatures between the normal boiling point of the hydrocarbon and the cracking temperature thereof are trimethylbenzene, o-ethyltoluene (1-methyl-2-ethylbenzene) 1-methyl-2-propyl-benzene, 1,3-dimethyl-4-ethylbenzene, tetramethylbenzene, 1-methyl-4-isobutylbenzene, 1,2-dimethyl-4-propylbenzene, 1,-2,4-trimethyl-5-ethylbenzene, 1-methyl-3-amyl-benzene, 1,3-dimethyl-4,6-diethylbenzene, 1-methyl-2-propyl-4-isopropylbenzene, 1,3,5-trimethyl-2,4-diethylbenzene, alpha and beta styrene, 1-phenyl-1,3-butadiene, 1-methyl-4-propenylbenzene, 1-phenyl-2-pentene, dimethyl naphthalene, dimethylanthracene, dimethylphenanthrene and the like.

Illustrative of the cyclo-olefins which can be oxidized to the corresponding carbonyl compounds by air in the presence of the "tellurium" catalyst at temperatures between the boiling point and the cracking temperature of the cycloolefin are 1-methyl-1-cyclobutene, 1-methyl-1-cyclopentene, 1,2-dimethyl-1-cyclopentene, 1-methyl-2-ethyl-1-cyclopentene, 1-methyl-2-propyl-1-cyclopentene, 1,2-dimethyl-1-cyclohexene, and 1-ethyl-3-methyl-1-cyclohexene.

Illustrative of the organic compounds, having a methyl or methylene group activated by the presence of a hydroxyl group, which can be oxidized to the corresponding carbonyl compounds by gaseous oxygen (pure or diluted), ozone and air in the presence of the "tellurium" catalyst at temperatures between the boiling point of the compound and the temperature at which said compound cracks or decomposes are the following: glycol, propandiol-1,2; propandiol-1,3; 1,2-dihydroxybutane, 1,4-dihydroxybutane, 2,3-dihydroxyhexane and the like. Monohydroxy compounds such as the aliphatic alcohols, ethanol, butanol, propanol, hexanol, octanol and the like can also be oxidized to the corresponding carbonyl compounds by gaseous oxygen in the presence of the "tellurium" catalyst at temperatures between the boiling point of the alcohol and the temperature at which the alcohol decomposes.

A characteristic of the catalyst disclosed hereinbefore is its capacity to promote the oxidation of methyl or methylene groups directly adjacent to a center of unsaturation in an organic compound such as, for example, the unsaturation found in aromatic compounds, olefins or carbonyl groups. A further distinguishing feature is the fact that although the catalyst catalyzes the oxidation of such methyl and methylene groups to carbonyl groups, =C—O or

it does not catalyze the oxidation of carbonyl groups to higher states of oxidation. Thus, it is specific for the following transformations:

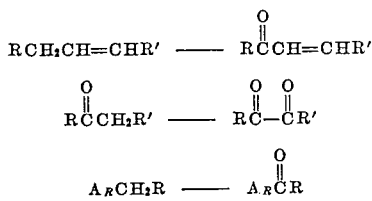

Compounds intermediate between the above reactants and the products in oxidation state such as, for example, benzyl alcohol, allyl alcohol and the like also can be oxidized using the technique disclosed hereinbefore. Ethylene can be oxidized to glyoxal and anthracene to anthraquinone as can organic substances which form in situ reactants such as those the oxidation of which has been discussed herein or their intermediate oxidation products through dehydrogenation, dehydration, rearrangement, dehalogenation, dehydrohalogenation and similar reactions, for instance, methyl cyclohexadiene, tertiary butanol, beta-pinene, 2,3-diiodopropane and alpha-bromodiethylketone.

I claim:

1. In the method of converting propylene to acrolein which comprises passing refinery gases containing propylene mixed with gas containing free oxygen through a catalyst consisting predominantly of an oxide of tellurium, the improvement which comprises employing a catalyst containing about 1 to about 40 mole per cent of an oxide of rhenium and the balance consisting predominantly of an oxide of tellurium.

2. The method of converting propylene to acrolein as described and set forth in claim 1 wherein the catalyst contains about 2 to about 20 mole per cent of an oxide of rhenium and the balance consists predominantly of an oxide of tellurium.

3. In the method of converting activated groups selected from methyl and methylene groups to carbonyl groups which comprises passing an organic substance having an activated radical selected from the group consisting of methyl and methylene radicals mixed with a gas containing free oxygen through a catalyst consisting predominantly of an oxide of tellurium, the improvement which comprises employing a catalyst consisting essentially of about 1 to about 40 mole per cent of an oxide of rhenium and the balance consisting predominantly of an oxide of tellurium.

4. The invention as described and set forth in claim 3 wherein the catalyst contains about 2 to about 20 mole per cent of an oxide of rhenium and the balance consists predominantly of an oxide of tellurium.

5. In the method of converting an activated group selected from a methyl and methylene radical to a carbonyl radical which comprises passing a gaseous mixture comprising gas containing free oxygen and a compound having a composition corresponding to the formula Z—CH$_2$R through a catalyst consisting essentially of an oxide of tellurium, said compound Z—CH$_2$R being a compound in which Z is a monovalent radical having an activating group selected from the group consisting of olefinic C=C, C≡C, C=O, OH, and aromatic C=C, and R is selected from the group consisting of hydrogen, alkyl, cycloalkyl, aryl and heterocyclic, the improvement which comprises employing a catalyst consisting essentially of about 1 to about 40 mole per cent of an oxide of rhenium and the balance consisting predominantly of an oxide of tellurium.

6. The invention as set forth and described in claim 5 wherein the catalyst consists essentially of about 2 to about 20 mole per cent of an oxide of rhenium and the balance consists predominantly of an oxide of tellurium.

7. A novel catalyst consisting essentially of about 1 to about 40 mole per cent of an oxide of rhenium and the balance consisting predominantly of an oxide of tellurium.

8. A novel catalyst consisting essentially of about 2 to about 20 mole per cent of an oxide of rhenium and the balance consisting predominantly of an oxide of tellurium.

WILLIAM R. MIDDLETON.

References Cited in the file of this patent

UNITED STATES PATENTS

| Number | Name | Date |
|---|---|---|
| 1,103,017 | Ellis | July 7, 1914 |
| 2,227,672 | Pier et al. | Jan. 7, 1941 |
| 2,383,711 | Clark et al. | Aug. 28, 1945 |
| 2,451,485 | Hearne et al. | Oct. 19, 1948 |
| 2,530,923 | Turk | Nov. 21, 1950 |

FOREIGN PATENTS

| Number | Country | Date |
|---|---|---|
| 13,297 | Great Britain | 1915 |
| 625,330 | Great Britain | 1946 |